United States Patent
Freese et al.

(10) Patent No.: US 10,723,198 B2
(45) Date of Patent: Jul. 28, 2020

(54) VENTILATION SYSTEM AND VENTILATION METHOD FOR A MOTOR VEHICLE

(71) Applicant: Dr. Ing. h.c. F. Porsche Aktiengesellschaft, Stuttgart (DE)

(72) Inventors: Bastian Freese, Stuttgart (DE); Moritz Hornung, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 129 days.

(21) Appl. No.: 15/679,779

(22) Filed: Aug. 17, 2017

(65) Prior Publication Data
US 2018/0056750 A1    Mar. 1, 2018

(30) Foreign Application Priority Data

Aug. 30, 2016 (DE) .......................... 10 2016 116 115

(51) Int. Cl.
*B60H 1/00* (2006.01)

(52) U.S. Cl.
CPC ..... *B60H 1/00871* (2013.01); *B60H 1/00828* (2013.01); *B60H 1/00842* (2013.01); *B60H 1/00985* (2013.01)

(58) Field of Classification Search
CPC ............ B60H 1/00964; B60H 1/00828; B60H 1/00842; B60H 1/00985
USPC ........................................................ 454/75
See application file for complete search history.

(56) References Cited

U.S. PATENT DOCUMENTS

| | | | | |
|---|---|---|---|---|
| 6,347,987 B1* | 2/2002 | Ichishi | ................... | B60H 1/247 454/153 |
| 6,823,685 B2 | 11/2004 | Frühauf et al. | | |
| 7,497,251 B2* | 3/2009 | Ichishi | ............... | B60H 1/00792 165/202 |
| 8,111,250 B2* | 2/2012 | Boudewyns | ....... | B60H 1/00985 345/204 |
| 8,872,639 B2 | 10/2014 | Kinoshita et al. | | |

(Continued)

FOREIGN PATENT DOCUMENTS

| | | |
|---|---|---|
| DE | 10028538 A1 | 1/2002 |
| DE | 10037066 A1 | 2/2002 |

(Continued)

OTHER PUBLICATIONS

German Search Report for German Application No. 10 2016 116 115.2, dated Mar. 16, 2017 with partial translation—7 Pages.

(Continued)

*Primary Examiner* — Edelmira Bosques
*Assistant Examiner* — Phillip Decker
(74) *Attorney, Agent, or Firm* — RatnerPrestia

(57) ABSTRACT

A ventilation system for a motor vehicle, having a multiplicity of controllable air outlets, an input unit for selecting at least one flow target position in a passenger compartment of the motor vehicle from a multiplicity of selectable flow target positions. The selectable flow target positions can be displayed on a display unit, a control unit which is connected to the input unit and to the air outlets and is designed to set an outflow direction of at least one of the air outlets on the basis of at least one selected flow target position. In this context, at least two of the selectable flow target positions on the display unit are combined to form a flow target region with little draft.

15 Claims, 2 Drawing Sheets

(56) References Cited

U.S. PATENT DOCUMENTS

| | | | |
|---|---|---|---|
| 9,707,913 B1* | 7/2017 | Ochiai | B60N 2/0248 |
| 10,272,742 B2* | 4/2019 | Chavez Hernandez | |
| | | | B60H 1/00985 |
| 2007/0137850 A1* | 6/2007 | Straub | B60H 1/00735 |
| | | | 165/202 |
| 2014/0295746 A1* | 10/2014 | Chagnon | B60H 1/00371 |
| | | | 454/75 |
| 2015/0105976 A1* | 4/2015 | Shikii | G06F 3/0488 |
| | | | 701/36 |
| 2015/0352953 A1* | 12/2015 | Koravadi | B60K 37/06 |
| | | | 701/36 |
| 2016/0082808 A1* | 3/2016 | Perkins | B60H 1/00871 |
| | | | 165/11.2 |
| 2016/0272038 A1* | 9/2016 | Tanaka | B60H 1/00285 |
| 2018/0208017 A1* | 7/2018 | Hernandez | B60H 1/00985 |
| 2019/0077217 A1* | 3/2019 | Yu | B60H 1/00735 |
| 2019/0231228 A1* | 8/2019 | Larson | A61B 5/1115 |
| 2020/0064444 A1* | 2/2020 | Regani | G01S 13/931 |
| 2020/0148032 A1* | 5/2020 | Skapof | B60H 1/00985 |

FOREIGN PATENT DOCUMENTS

| | | | | |
|---|---|---|---|---|
| DE | 10324571 | B3 | 5/2004 | |
| DE | 10344701 | A1 | 5/2005 | |
| DE | 102005036624 | A1 * | 2/2007 | ............ B60K 37/06 |
| DE | 102008015343 | A1 | 9/2009 | |
| DE | 102008024061 | A1 | 11/2009 | |
| DE | 102010018105 | A1 | 10/2011 | |
| DE | 102011003432 | A1 | 8/2012 | |
| DE | 102011003435 | A1 | 8/2012 | |
| DE | 102012021519 | A1 | 5/2014 | |
| DE | 102012021519 | A1 * | 5/2014 | ......... B60H 1/00871 |
| DE | 102014200992 | A1 | 7/2015 | |
| DE | 102014011119 | A1 | 1/2016 | |
| JP | 2003341337 | A | 12/2003 | |
| JP | 2006232018 | A | 9/2006 | |
| JP | 2008265675 | A * | 11/2008 | |
| JP | 2008265675 | A | 11/2008 | |
| JP | 2013020334 | A | 1/2013 | |
| JP | 2014178139 | A | 9/2014 | |

OTHER PUBLICATIONS

Notification of Reason for Rejection for Japanese Application No. 2017-165004, dated Jun. 26, 2018, 9 pages.

* cited by examiner

VENTILATION SYSTEM AND VENTILATION METHOD FOR A MOTOR VEHICLE

CROSS-REFERENCE TO RELATED APPLICATIONS

This application claims priority to German Patent Application No. DE 10 2016 116 115.2, filed Aug. 30, 2016, the contents of such application being incorporated by reference herein in their entirety.

FIELD OF THE INVENTION

The present invention relates to a ventilation system for a motor vehicle, having a multiplicity of controllable air outlets, having an input unit for selecting at least one flow target position in a passenger compartment of the motor vehicle, and having a control unit which is connected to the input unit and to the air outlets and is designed to set an outflow direction of at least one of the air outlets on the basis of at least one selected flow target position.

The present invention also relates to a method for controlling a ventilation system of a motor vehicle, wherein at least one flow target position is selected in a passenger compartment of the motor vehicle.

BACKGROUND OF THE INVENTION

In the field of motor vehicle technology it is generally known to form ventilation systems for the passenger compartment of a motor vehicle with distributed air outlets which are controlled by a control unit in order to set the strength of the air flow which flows out. It is also known to set an outflow direction of the air outlet manually in order to be able to select specific body regions of passengers of the motor vehicle individually.

DE 10 2014 200 992 A1, which is incorporated by reference herein, discloses a user interface for controlling an air conditioning system of a motor vehicle, wherein the user interface has a contact-sensitive display device, a data processing unit and a proximity sensor system. A stylized representation of body regions of a user and a symbol for an air outlet can be displayed on the display device. A user input which is detected by means of the proximity sensor system causes an instruction relating to the possibility of contact-based inputting to be output between the symbol for the air outlet and the stylized representation of body regions. The user selects the strength of an air flow for an associated body region by means of the contact-based input.

DE 10 2011 003 432 A1, which is incorporated by reference herein, discloses an outlet for a ventilation system of a vehicle having a bearing element which is mounted in a flow duct and having a control element. A plurality of air directing elements are pivotably supported on the bearing element and can be pivoted by the control element. The control element can be deformed in such a way that the air directing elements can assumed a plurality of different orientations with respect to one another.

DE 10 2010 018 105 A1, which is incorporated by reference herein, discloses a vehicle cockpit with an operator control device for sensing user inputs and a method for operating an operator control device. A spatial area in which an activation element is located during the operator control of the operator control device is monitored for the presence of the at least one activation element. The ventilation system is controlled in such a way that the outflow of the fluid is changed as a function of the sensed presence of the activation element in such a way that during the operator control no fluid flow is brought about in the region of the activation element.

In addition, DE 10 2008 024 061 A1, which is incorporated by reference herein, discloses a vehicle air conditioning system having at least two adjustable climate styles. An actual passenger compartment temperature is regulated by automatic control of one or more blowers and of air distribution flaps as a function of a set climate style. At least one further parameter which influences the actual passenger compartment temperature can be influenced as a function of the climate style which is preset by the user.

DE 103 44 701 A1, which is incorporated by reference herein, discloses a method for setting a motor vehicle air conditioning system. A body region to which the air conditioning system is to be set can be selected. Setpoint values for the volume flow, the temperature and/or the outlet paths of air-conditioned air flows can be changed as a function of the selected body region and as a function of a qualified presetting by the user.

DE 103 24 571 B3, which is incorporated by reference herein, also discloses a vehicle air conditioning system in which in a fully automatic operating mode a user can adapt a blower power and air distributor flaps in accordance with his or her individual sensitivity to drafts, without resulting in an automatic operating mode being exited. For this purpose, the air conditioning system has a setting device at which the user can make settings. A setting value is transmitted to the air conditioning system which selects adapted automatic characteristic curves and carries out actuation of the blower and of the air distribution flaps in accordance with these characteristic curves.

DE 100 37 066 A1, which is incorporated by reference herein, discloses a vehicle air-conditioning device with an operator control element which supplies a predefined value to a control unit. A flow state is given by an air speed and a degree of turbulence of the air which can be influenced by the strength of the blowers, the air distribution to the outflow nozzles, the outflow direction and by further actions. A flow state which is desired by the vehicle occupant and a thermal state are predefined with at least one operator control panel.

Finally, DE 100 28 538 A1, which is incorporated by reference herein, discloses a vehicle air-conditioning system, wherein an outflow situation determines the outflow of air, wherein a specific air distribution, a specific strength of the blower, a percentage air mass flow at each nozzle and a specific outflow direction are predefined. Surface temperatures or characteristic values for the thermal comfort of the vehicle occupants are determined over the area which is to be air-conditioned. The selection of the optimum outflow situation occurs by means of the determined surface temperatures or the characteristic values for the thermal comfort.

SUMMARY OF THE INVENTION

Described herein is a ventilation system and a method for controlling a ventilation system in which ventilation or oncoming air flow can be simply set with little draft.

According to aspects of the invention, a ventilation system for a motor vehicle has a multiplicity of controllable air outlets, having an input unit for selecting at least one flow target position in a passenger compartment of the motor vehicle from a multiplicity of selectable flow target positions, wherein the selectable flow target positions can be displayed on a display unit, and having a control unit which is connected to the input unit and to the air outlets and is designed to set an outflow direction and/or an outflow rate of at least one of the air outlets on the basis of at least one selected flow target position, wherein at least two of the selectable flow target positions are combined on the display unit to form a flow target region with little draft. As used herein and in the claims, the term "flow target region" is also referred to as "flow output region," meaning the region in the passenger compartment to which airflow is output.

In addition, a method for controlling a ventilation system of a motor vehicle is described. The ventilation system comprises the steps of selecting at least one flow target position in a passenger compartment of the motor vehicle, which position is assigned to a flow target region with little draft, and of setting an outflow direction of at least one of a multiplicity of controllable air outlets on the basis of the at least one selected flow target position in such a way that ventilation with little draft is configured, in particular for a passenger in a passenger compartment of the motor vehicle.

Basically, with the ventilation system it is possible to set the outflow direction of the multiplicity of air outlets on the basis of the selected flow target position. Therefore, all that is necessary is to make a single selection of the flow target position in order to set all the air outlets with respect to their outflow direction and correspondingly orient the air flow onto the selected flow target position, in particular onto a flow target position on the body of a passenger in the passenger compartment. As a result, a precise oncoming air flow is possible in the passenger compartment of the vehicle with little outlay. It will be understood that it is also possible for the volume flow which flows from the respective air outlets to be capable of being actuated individually by means of the control unit.

In many cases, it is desirable for a passenger to select a flow target position in such a way that the passenger (or the passengers) are adversely affected as little as possible by draft. It is therefore sometimes desirable to select a flow target position in which little draft is configured, that is to say, in particular, there is not a direct flow onto a passenger or there is only a very low flow rate onto a passenger.

Ventilation with little draft can include an outflow direction of at least one of the air outlets not corresponding to the outflow direction which is suggested by the selected flow target position.

By selecting a flow target position which is assigned to the flow target area it is possible to configure ventilation with little draft in a simple way.

It is particularly advantageous if the display unit is a graphic display unit of the type of a display.

In one preferred embodiment, the flow target region with little draft is displayed on the display unit in a manner which can be differentiated from the selectable flow target positions.

The flow target region can be displayed continuously here or if necessary, in particular after activation.

According to a further preferred embodiment, the flow target region is displayed as an irregular area on the display unit.

The area is represented, in particular, about a body contour of a passenger which is represented in a schematic fashion, or in a partially overlapping fashion with such a body contour.

The flow target region has here a larger area than a selectable flow target position. The representation of the flow target region as an area about the body contour is made clear to the passenger in such a way that when selecting a flow target position which is assigned to this flow target region said passenger avoids or reduces a draft onto himself or herself. In other words, in this way operation of the ventilation system with little draft is proposed or suggested to the passenger.

In addition, it is advantageous overall if the control unit is designed to sense a selection process by a passenger, wherein the control unit is also designed to display the flow target region only when a selection process is carried out.

As a result, the representation of the ventilation system on the display unit can generally be kept simple and clear and is added to only as required in such a way that the flow target region appears, specifically, in particular, when the passenger carries out a selection process in which a flow target position away from the body of the passenger is selected. In other words, when a flow target position is selected outside the body contour the flow target region can automatically appear in order in this way to clarify to the passenger that he or she now has configured a flow target position with little draft.

In a further overall preferred embodiment, the at least one selectable flow target position can be displayed as a target, as a target cross or as a target point.

The flow target position has here the function of a cursor. The flow target position which is represented preferably has a regular shape, that is to say a fixed, invariable and clearly identifiable shape, in particular an essentially point-symmetrical shape.

Both the flow target position and the flow target region are preferably represented graphically with respect to a body contour.

Overall, it is also advantageous if the display unit has a central display on a dashboard of the vehicle.

The central display can, for example, be provided centrally on the dashboard, but can also be arranged in the region of a speedometer or the like.

According to a further preferred embodiment which may constitute a separate invention, the display unit has a decentralized display which is arranged in the region of a hand rest and/or arm rest of a passenger compartment of a vehicle, and/or the input unit has a decentralized input device which is arranged in the region of a hand rest and/or arm rest of a passenger compartment of the vehicle.

The actuation of the adjustable and controllable air outlets can consequently take place not only by means of a central input device on the dashboard of the motor vehicle but either via a touch display or a separate electromechanical input unit such as a push and turn actuator or the like.

The decentralized input device can be used here (alone or alternatively) to set the flow target position. In addition, such a flow target position can preferably also be displayed on the decentralized display, specifically alternatively or in addition to a display on a central display on a dashboard.

As a result of the direct spatial assignment of the decentralized display and/or of the decentralized input device to the hand rest and/or arm rest in the passenger compartment of a vehicle (centrally or laterally), ergonomic activation of the ventilation system, in particular very precise setting of the flow target position, in particular in the driving mode, is possible.

According to one preferred embodiment the central display and/or the decentralized display are/is embodied as a touch-sensitive display which forms an input device of the input unit.

A touch-sensitive display in the form of a touch display permits particularly ergonomic activation of the ventilation system.

In addition it is preferred if a selectable flow target position and/or a flow target area with little draft is represented on the decentralized display in a simplified form.

The simplified form permits rapid sensing by a driver, with the result that the latter is not distracted by the setting of the ventilation system. The simplified form is, in particular, simplified compared to a representation on a central display.

In addition, it is advantageous overall if a central display is synchronized with the decentralized display and/or with the decentralized input unit.

This measure makes it possible to ensure that activation of the decentralized input device can be visualized on the central display. This promotes ergonomics further.

In addition, it is advantageous overall if the control unit is designed to set the outflow direction of at least one of the air outlets for a selected flow target position within the flow target range in such a way that ventilation with little draft is configured, specifically for a passenger.

In particular, there is not a direct flow onto the passenger. Outflow directions do not necessarily correspond to a suggested outflow direction according to the selected flow target position.

Overall, the invention can be described alternatively as follows and/or preferably brings about at least one of the advantages below.

Certain regions on a display unit are combined and defined as "with little draft". If any flow target position within such a flow target region is selected, then the flow target directions of the air outlets are always set in such a way that ventilation with little draft is ensured. In this case, an outflow direction which is set does not have to correspond to the selected flow target position. Additionally or alternatively, a separate operator control face or input device can be provided, in particular in the region of the hand rest/arm rest of the operator.

The functions described above can be used, in particular, to ensure a setting of flow target directions and/or of outflow opening values (such as, for example, an outflow volume rate) with little draft. As a result, flow target regions of flow target positions can be defined which suggest a function with a little draft to the operator. If a flow target position within such a flow target region is selected, the flow target directions and/or the outflow opening values of one or more air outlets can be set in such a way that ventilation with little draft is ensured. The flow target directions do not necessarily correspond here to the direction which is suggested by the selected flow target position.

Regions which are stored for such a function with little draft can be characterized graphically on the operator control interface. The graphic characterization of the regions can be limited to such time periods in which a user carries out an adjustment action. If a function with little draft is activated, this can be displayed on the operator control interface by graphic characterization. This can be done, for example, by highlighting the region about the passenger.

In addition to the adjustment of the flow target position on a central operator control panel, this can also be done on a further operator control panel. This can be both a touch display as well as some other touch-sensitive surface.

By means of adjustment on the additional operator control panel it is possible to change a flow target position. The changed flow target position is preferably displayed on the central operator control panel.

If the additional operator control panel is a touch display, the operator control interface of the central operator control panel can be represented here in an identical fashion or changed fashion. In particular, a highly simplified representation of the operator control interface can occur here.

The additional operator control interface is preferably positioned in such a way that a good hand rest/arm rest is possible for the operator. This permits very precise setting of the flow target position, in particular in the driving mode.

In one preferred embodiment, two flow target positions can be set per passenger.

As a result, each passenger can easily select between a direct oncoming air flow, that is to say directed onto the position, and an indirect flow, that is an oncoming air flow past the position.

In one preferred embodiment, the two flow target positions can be set independently of one another or in a coupled fashion.

During the coupled movement, the flow target positions can be reflected together in height and horizontally. The reflection occurs at an axis of symmetry which is formed by the person onto which there is a flow. This can simplify the operator control of the ventilation system.

Of course, the features which are mentioned above and are still to be explained below can be used not only in the respectively specified combination but also in other combinations or alone without departing from the scope of the present invention.

BRIEF DESCRIPTION OF THE DRAWING FIGURES

Exemplary embodiments of the invention are illustrated in the drawing and will be explained in more detail in the following description. In the drawing.

DETAILED DESCRIPTION OF THE INVENTION

Figure 1:
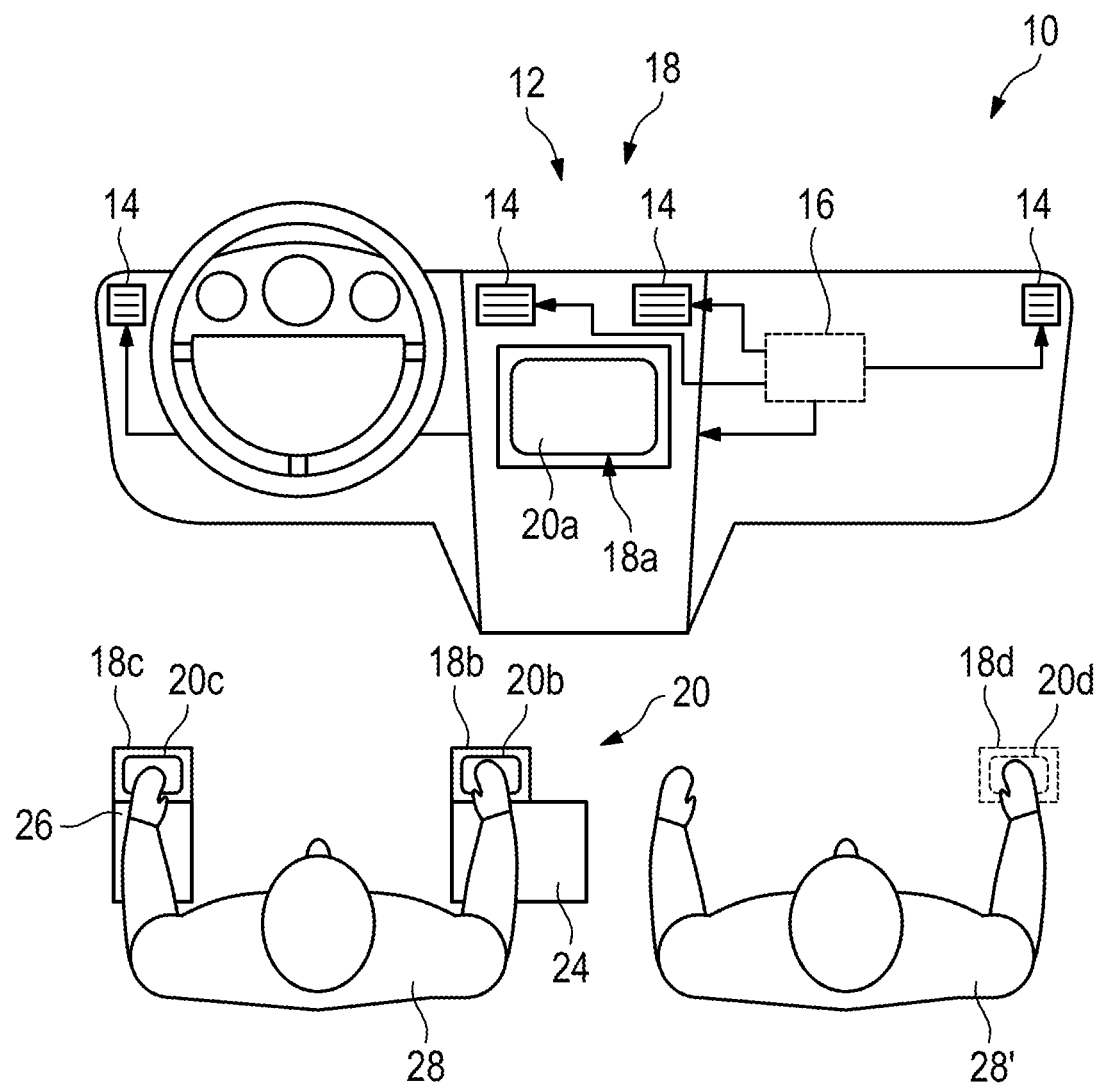
FIG. 1 shows a schematic representation of a passenger compartment of a motor vehicle having a multiplicity of air outlets.

In FIG. 1, a passenger compartment with a cockpit of a motor vehicle are represented schematically and denoted generally by 10.

The motor vehicle has a ventilation system 12 for ventilating the passenger compartment of the motor vehicle. The ventilation system 12 includes a multiplicity of controllable air outlets 14 which are connected to a blower and permit a flow of air into the passenger compartment of the motor vehicle. The controllable air outlets 14 are connected to a control unit 16 in order to control the air outlets, in particular to set their outflow direction, and to set a value of an outflow opening or a volume flow rate which flows out of the respective air outlets.

The control unit 16 controls here in particular, actuators for adjusting the outflow direction and for adjusting the outflow rate, wherein the setting is preferably carried out individually for each outlet.

The ventilation system 12 also has an input unit 18 by means of which the ventilation system 12 can be activated.

In addition, the ventilation system 12 has a display unit 20 on which a setting of the ventilation system can be displayed.

The display unit 20 can have, in particular, a central display 20a which is integrated into a dashboard in the passenger compartment 10. The central display 20a is embodied, in particular, as a graphic display, in the manner of a monitor, with the result that functions of the ventilation system 12 can be represented graphically on the central display 20a.

The central display 20a can be embodied as a touch-sensitive display in the manner of a touch display. In this case, the central display 20a forms at least part of the input unit 18 as is indicated schematically by 18a in FIG. 1.

Flow target positions in the passenger compartment 10 of the motor vehicle and/or on the body of a passenger can be selected by means of the ventilation system 12. An outflow direction and/or an outflow rate of the air outlets 14 is set by means of the control unit 16 on the basis of the selected flow target position. An optimum desired oncoming air flow with fresh air can be ensured in this way.

The control unit 16 has a computing unit which is preferably designed to calculate coordinates of a selected flow target position, wherein the control unit 16 is designed to set the outflow direction of at least one air outlet 14, preferably of all the air outlets 14, on the basis of the coordinates which are calculated in this way.

During the setting of the air outlets 14, the control unit can, for example, also take into account a sitting position of a passenger, which position can be sensed, for example, by means of vehicle seat sensors. If appropriate, it is also possible to register a body size of a passenger, either by means of a manual input or by means of a scanner or the like. The passenger's weight can also be a parameter which is taken into account by the control unit 16.

In addition, characteristic body points can be acquired by means of one or more passenger compartment cameras and selected in accordance with the input of the passenger and a flow can be directed onto them.

FIG. 1, in addition to the schematically represented cockpit it is also represented that a central arm rest 24 and a lateral arm rest 26 can be formed in the passenger compartment on which a passenger 28, in particular a driver of the motor vehicle, can rest his arms during the journey. FIG. 1 shows a passenger 28, both of whose arms are arranged on the arm rests 24, 26. In the driving mode, it is preferred in the case of a non-autonomous vehicle if at least one hand is arranged on a steering wheel.

In FIG. 1 it is apparent that the input unit 18 can have, in addition to the central input device 18a, at least one further decentralized input device which is assigned to a respective arm rest. In FIG. 1, a decentralized input device 18b is assigned to the central arm rest 24. The lateral arm rest 26 is, alternatively or additionally, assigned a decentralized input device 18c. The input devices 18b, 18c are arranged in such a way that they can be activated in an ergonomically simple way by the passenger 28 if an arm is resting on the respective arm rest.

However, in other embodiments the decentralized input devices can also be arranged at a distance from such arm rests.

It is to be noted that the decentralized input devices 18b, 18c can also each be assigned decentralized displays 20b and 20c. The same information can be displayed thereon as on the central displays 20a. The decentralized displays 20b, 20c are, however, preferably configured in such a way that information is displayed thereon in a highly simplified form, or only part of the information displayed on the central display 20a is displayed thereon.

Two flow target positions can be set per passenger 28, 28'. These setting positions or flow target positions can be set independently or in a coupled fashion. In this context, the flow target positions move together vertically and in the horizontal direction, wherein the axis of reflection is also formed by a longitudinal axis or an axis of symmetry of the respective passenger 28, 28'.

Figure 2:
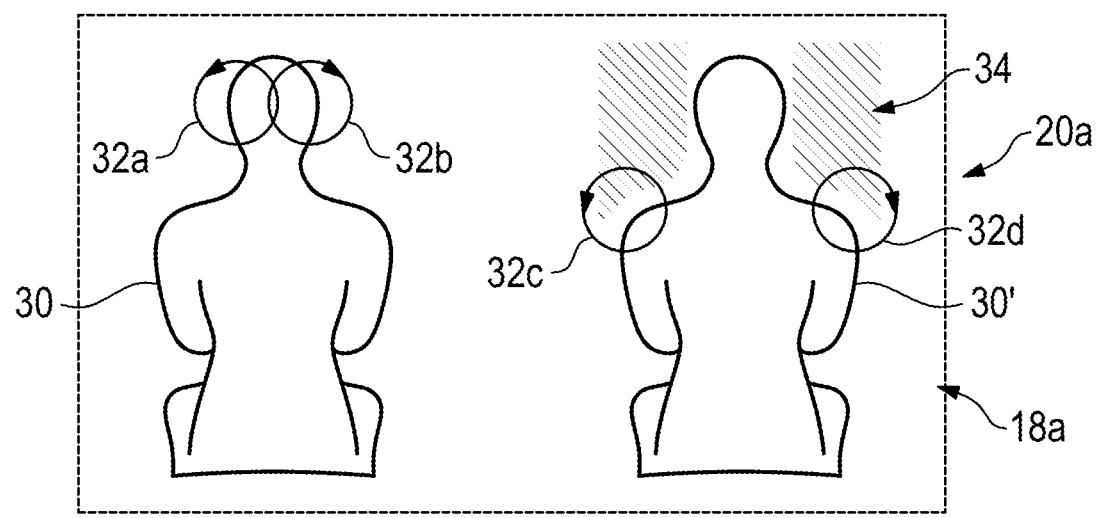
FIG. 2 shows a schematic representation of a central display of a ventilation system.

An example of a display unit in the form of a centralized display 20a is illustrated in a schematic form in FIG. 2.

The body contours of two passengers 30, 30' are represented on the central display 20a. In addition, two flow target positions 32a, 32b are shown for the passenger 30 shown on the left-hand side, which flow target positions 32a, 32b are directed essentially onto the head of the passenger 30. Such flow target positions are selected by a passenger, for example, when he or she would like to receive a direct cooling flow of air into their face.

On the left-hand side, a further pair of flow target positions 32c, 32d are shown for the passenger 30', said flow target positions 32c, 32d being arranged in the region of the shoulders of the passenger 30'. These positions are at least partially arranged outside the body contour of the passenger 30' and therefore activate the display of a flow target region 34 which signals that the selected flow target positions 32c, 32d each represent flow target positions with little draft at which the passenger 30' is subjected to as little direct draft as possible.

The display region 34 is arranged as an irregular area about the body contour 30' of the passenger and can be displayed continuously, but is displayed here when a flow target position which is to have as little draft as possible is selected. As a result of the fact that the display region 34 is represented in a planar fashion around the contour 30', it is suggested to the passenger that he or she select a flow target position at which he or she does not receive any draft.

In fact, when the flow target positions 32c or 32d are selected, the set of air outlets 14 is actuated by means of the control unit in such a way that their outflow directions are directed away from the body contour 30' of the assigned passenger and/or actuated with an outflow rate which is so low that the passenger does not experience any draft.

The configuration of a flow target position with little draft is therefore simplified significantly by displaying the flow target region 34 with little draft (e.g., at or below a predetermined flow value).

The central display 20a is preferably embodied as a touch display and therefore forms a central input device 18a. In other words, a passenger can select a flow target position 32 by touching the central display 20a, wherein he or she can move their finger on the display in order to select the respective flow target position. When selecting a flow target position which lies to a smaller extent within the body contour 30', such as, for example, the flow target positions 32c, 32d, the flow target region 34 then appears additionally on the display in order to suggest that these flow target positions are positions with little draft.

Although the illustration in FIG. 2 suggests that air outlets 14 are directed into the outer region of the shoulders of a passenger with the body contour 30', ventilation with little draft is, under certain circumstances, also configured by virtue of the fact that the air outlets are actuated differently, with the result that they are, for example, not aimed directly at these shoulder regions in order to configure the ventilation with little draft overall.

In FIG. 2, the flow target positions 32 are each illustrated as circular areas or targets. The flow target positions 32 which can be selected can, however, also be displayed as a target cross or as a target point, in each case in the manner of a cursor and preferably essentially in a dot-symmetrical fashion. The size of the representation of the flow target position 32 is in each case smaller than the total area of the represented flow target region 34.

Figure 3:
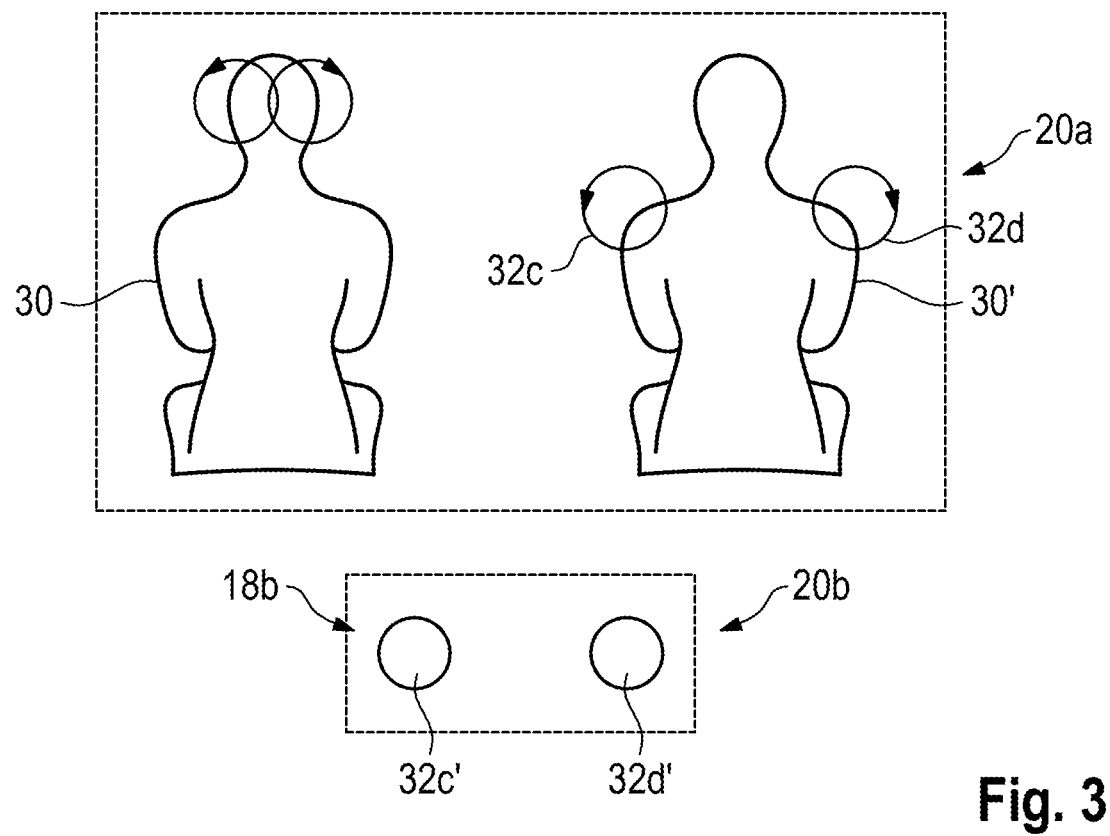
FIG. 3 shows a schematic representation of a central display and of a decentralized input device of a ventilation system.

FIG. 3 illustrates the central display 20*a* and, for example, the decentralized display 20*b*, which simultaneously forms a decentralized input device 18*b*.

Two flow target positions 32*c*' and 32*d*' which correspond to the flow target positions 32*c*, 32*d* on the central display 20*a* are illustrated in schematic form on the decentralized display 20*b*.

Owing to the embodiment as a touch screen display, an operator can, with their arm resting on the arm rest 24, operate the touch display with, for example, two fingers by moving said fingers to and fro on the decentralized touch display 20*b*. In this context, this is synchronized with the display on the central display 20*a*, with the result that the driver can track, solely with his view on the central display, which flow target position he currently chooses or selects.

The decentralized input device 18*b* can also be embodied as a pure touch panel without a display possibility. In so far as the decentralized display 20*b* is provided, the information about the ventilation system is represented thereon in a highly schematic and simplified fashion compared with the display on the central display 20*a*.

What is claimed is:

1. A ventilation system for a motor vehicle, comprising:
   a multiplicity of controllable air outlets,
   an input unit for selecting at least one flow target position in a passenger compartment of the motor vehicle from a multiplicity of selectable flow target positions displayed on a display unit,
   a control unit which is connected to the input unit and to the air outlets, the control unit being configured to set an outflow direction or an outflow rate of at least one of the air outlets on the basis of at least one selected flow target position,
   wherein the control unit is configured to (i) automatically display on the display unit a flow output region that is located above shoulders of a passenger and around, but not on, a head of the passenger in response to a user selecting two of the flow target positions on the display that correspond to the shoulders of the passenger on the display, and (ii) set the outflow direction or the outflow rate of said at least one of the air outlets to have a draft on the head of the passenger that is lower than a predetermined value.

2. The ventilation system as claimed in claim 1, wherein the flow output region which has a lower draft is displayed on the display unit in a manner which can be differentiated from the selectable flow target positions.

3. The ventilation system as claimed in claim 2, wherein the flow output region is displayed as an irregular area on the display unit.

4. The ventilation system as claimed in claim 1, wherein the control unit is configured to sense a selection process by the passenger and display the flow output region only when a selection process is carried out.

5. The ventilation system as claimed in claim 1, wherein the at least one selectable flow target position is displayed as a target, as a target cross or as a target point.

6. The ventilation system as claimed in claim 1, wherein the display unit has a central display on a dashboard of the vehicle.

7. The ventilation system as claimed in claim 6, wherein either (i) the display unit has a decentralized display which is arranged in a region of a hand rest or arm rest of the passenger compartment of the vehicle, or (ii) the input unit has a decentralized input device which is arranged in the region of the hand rest or the arm rest of the passenger compartment of the vehicle.

8. The ventilation system as claimed in claim 7, wherein either the central display or the decentralized display is embodied as a touch-sensitive display which forms an input device of the input unit.

9. The ventilation system as claimed in claim 7, wherein the selectable flow target position or the flow output region with the lower draft is illustrated on the decentralized display.

10. The ventilation system as claimed in claim 7, wherein the central display is synchronized with the decentralized display or with the decentralized input device.

11. The ventilation system as claimed in claim 1, wherein two flow target positions can be set per passenger.

12. The ventilation system as claimed in claim 11, wherein the two flow target positions are configured to be set independently of one another or in a coupled fashion.

13. The ventilation system as claimed in claim 1, wherein the system is configured to account for a sitting position of the passenger in the vehicle and select a flow target position based upon the sitting position.

14. The ventilation system as claimed in claim 1, wherein the system is configured to register a body size of the passenger in the vehicle, and select a flow target position based upon the body size.

15. The ventilation system as claimed in claim 1, wherein the system is configured to acquire characteristic body points on the passenger in the vehicle using a camera, and, select a flow target position based upon the acquired characteristic body points.

* * * * *